United States Patent

Goeke

[15] 3,659,531
[45] May 2, 1972

[54] DRAWING MACHINE FOR RODS AND TUBING

[72] Inventor: Alfons Goeke, Solingen, Germany

[73] Assignee: Th. Kieserling & Albrecht, Solingen, Germany

[22] Filed: Sept. 4, 1969

[21] Appl. No.: 855,135

[30] Foreign Application Priority Data

Sept. 7, 1968    Germany..................P 17 77 110.7

[52] U.S. Cl....................................105/30, 105/73, 214/1.4
[51] Int. Cl..........................................................B23q 5/22
[58] Field of Search.....................214/1.1, 1.4; 105/30, 73

[56] References Cited

UNITED STATES PATENTS 3,152,686  10/1964  Spindler et al..........................214/1.1
3,446,158  5/1969   Pettit........................................105/73 X

FOREIGN PATENTS OR APPLICATIONS 1,022,080  3/1966  Great Britain.............................105/30
1,022,079  3/1966  Great Britain.............................105/30

Primary Examiner—Gerald M. Forlenza
Assistant Examiner—Frank E. Werner
Attorney—Michael S. Striker

[57] ABSTRACT

An arrangement by which elongated articles are drawn through a carriage rolling on guide tracks extending along the drawing path. Rollers mounted on the carriage are pressed against the guide tracks through hydraulic cylinders to develop the friction required to move the carriage along the guide tracks. Hydraulic motors on the carriage are mechanically linked to the rollers for the purpose of supplying the necessary driving power of the carriage. The traction or driving force required to move the carriage for the drawing operation is developed entirely through friction between the rollers and the guide tracks.

10 Claims, 9 Drawing Figures

Patented May 2, 1972

INVENTOR:
ALFONS GOEKE

INVENTOR:
ALFONS GOEKE

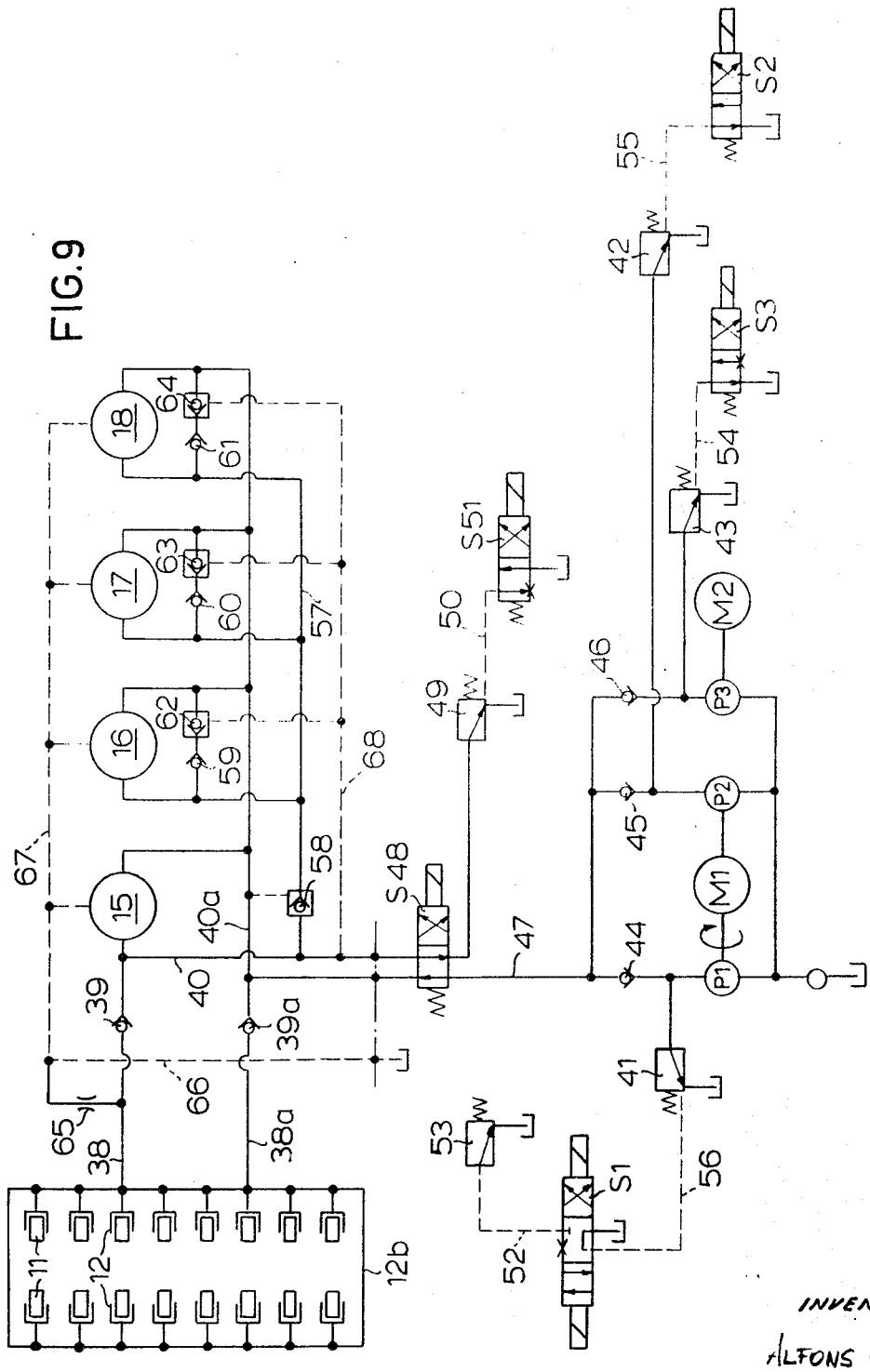

DRAWING MACHINE FOR RODS AND TUBING

BACKGROUND OF THE INVENTION

The present invention resides in a drawing machine for elongated and extended articles such as bars, rods, or tubes, in which the drawing carriage rides upon guide tracks through rollers, and a driving mechanism on the carriage moves the latter to and from, along the drawing path. The present invention is concerned with the particular construction of the drawing carriage drive mechanism, as well as the transmission of the required feed power for the drawing carriage by which substantially high drawing and return speeds of the carriage are made possible even when high drawing forces are incurred.

Considerable power capability is already available in modern multiple drawing benches for articles such as rods, or tubes, produced through automatic production processes. However, the drawing carriage or the drawing benches are moved back and forth through chains, and this feature is unsatisfactory since the attainable drawing speed is too small and the idling time of the drawing carriage speed is too small and is too large. The idling time is that duration required to return the drawing carriage into its initial position in front of the matrix frame, after terminating a drawing process. The time necessary for the charging process of the front bench in which the subsequent drawing material is brought into the ready position in front of the matrixes, is substantially less than the time necessary for returning the drawing carriage in front of the matrix frame. If it were possible to increase the return speed of the drawing carriage so that the latter is brought again into its initial position in front of the matrix frame within the charging time interval, the efficiency of multiple drawing benches could be made substantially larger. However, in view of the large masses associated with the drawing carriage, the chains, the driving linkage and the driving motor, the accelerating and braking time intervals are correspondingly high or large.

Cable drawing benches are known in the art in which theoretically high speeds for the drawing and return motions of the drawing carriage may be attained in the form of, for example 100 to 300 m/min. However, with such drawing benches, only relatively small drawing forces may be applied, since the cables and the cable drum will, otherwise, require an undesirably large diameter. Thus, with large cable drums, the associated masses will again limit the drawing and return velocities of the drawing carriage.

Drawing benches are also known in the art in which the back-and-forth motion of the drawing carriage is carried out without any pulling means. For driving the drawing carriage in such arrangements, a gear rack and pinion are used. The pinions provided on the drawing carriage are driven through electrical motors mounted on the carriage, and mesh at the same time with gear racks mounted on the bed of the machine along the sides of the drawing carriage. The drawing carriage is supported by rollers which ride on guide tracks arranged parallel to the gear racks. With drawing benches having large drawing lengths, however, the use of such gear racks involves a costly arrangement because of the requirement for precise positioning of the gear racks with respect to the driving members. For this reason, drawing benches with gear racks are not extensively used.

In accordance with the present invention, an arrangement is provided which does not use a drawing or pulling medium while permitting, at the same time, the application of large drawing forces for achieving substantially high drawing and return velocities of the drawing carriage. The present invention is based on a conventional drawing machine, but uses a carriage provided with rotors which ride upon guide tracks. The carriage is moved back and forth on the tracks through a driving arrangement mounted on the carriage The present invention differs from the conventional arrangements by providing that the required feed forces for moving the carriage are solely derived from friction between the rollers and the guide tracks. For the purpose of generating the required high frictional forces between the guide rollers of the drawing carriage and the guide tracks on the bed of the machine, the rollers are pressed against the guide tracks through hydraulically-operated pistons. In a preferred arrangement of the present invention, the rollers and their intermediate driving linkage are assembled group-wise in bridges which are movably arranged in a vertical plane in the drawing carriage. The pressure of the hydraulic medium for actuating the piston is made dependent upon the required torque for driving the rollers. Thus, the greater the drawing force which is applied, the greater is the pressure between the rollers and the guide tracks.

In the conventional drawing benches which are equipped with gear racks, the electrical motors used to drive the pinions on the drawing carriage, receive power from slide rails or slide lines. In view of the large weight of the electrical motors and thereby their large mass, the desired high return speed of the carriage cannot be achieved. In accordance with the present invention, the rollers of the drawing carriage are driven through hydraulic motors in which the flow lines of the oil are arranged in parallel in flowing to and from the motors. These oil flow lines are connected, through check valves, to the pressure lines of the parallel-arranged pistons for pressing the rollers against the guide tracks. For a predetermined capacity, the dimensions and weight of the hydraulic motors are essentially smaller than those of electrical motors. The pressurized fluid is conducted to the hydraulic motors on the drawing carriage, through means of flexible tubing. The pressure of the oil rises in accordance with the drawing power to be generated.

Since all cylinders of the pistons for pressing the rollers against the guide tracks are connected in parallel to the pressure lines of the hydraulic motors which are also connected in parallel, the rollers become pressed against the guide tracks as a function of the drawing power which is to be generated. For the return motion of the drawing carriage, only one of the provided hydraulic motors need be operated, for example, to drive the rollers, and the entire available quantity of oil may be applied to this motor. In this manner, the motor can return the drawing carriage to its initial position with the maximum permissible speed. It is, of course, also possible to provide a separate hydraulic motor with high rotational speed for the return of the drawing carriage. At the same time, it is possible to provide a motor with a corresponding intermediate drive through which the higher speed may be realized, and which may be disconnected when desired, through a coupling.

SUMMARY OF THE INVENTION

An arrangement by which elongated articles such as rods or tubing is drawn. A drawing carriage moves back and forth on guide tracks extending along the drawing path. The carriage rides on rollers mounted on the carriage. Hydraulic motors on the carriage drive the rollers, and provide the torque required to carry out the drawing operation. The traction required to move the carriage along the tracks is supplied entirely through friction between the rollers and the guide tracks. The friction is generated as a result of the action of hydraulic pistons which apply substantially large forces for pressing the rollers against the guide tracks. The pressure exerted by these hydraulic cylinders so as to generate the necessary friction, is made dependent upon the torque required to drive the rollers along the guide tracks.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 9 is a hydraulic circuit diagram for the control of the hydraulic motors and the hydraulic pistons for driving the rollers and pressing them against the guide tracks.

DESCRIPTION OF THE PREFERRED EMBODIMENTS

Figure 1:
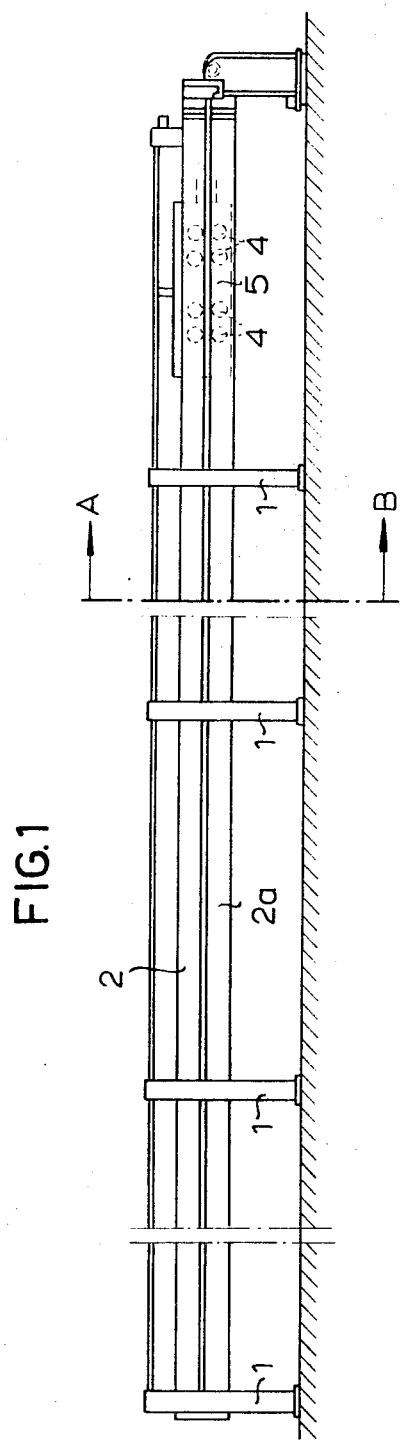
FIG. 1 is a side view of the drawing machine, in accordance with the present invention.
Figure 2:
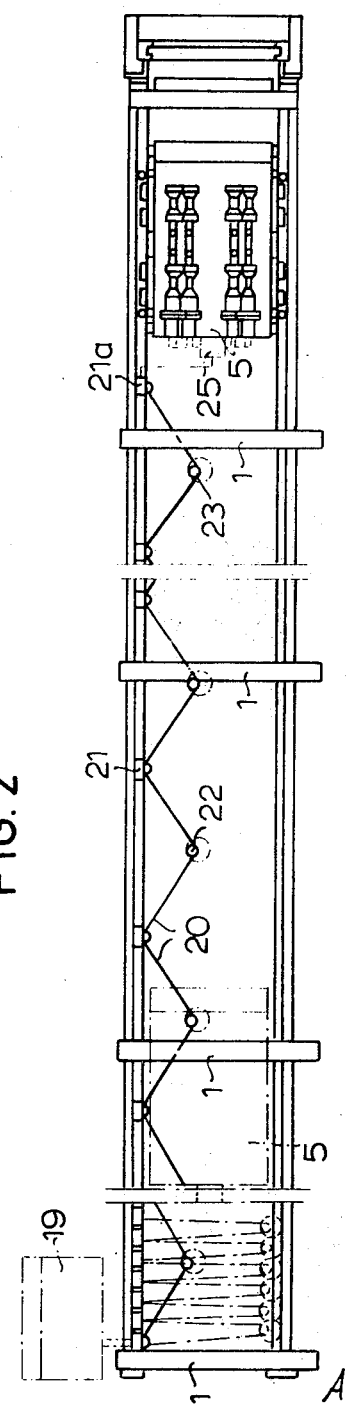
FIG. 2 is a plan view of the drawing machine of FIG. 1.
Figure 3:
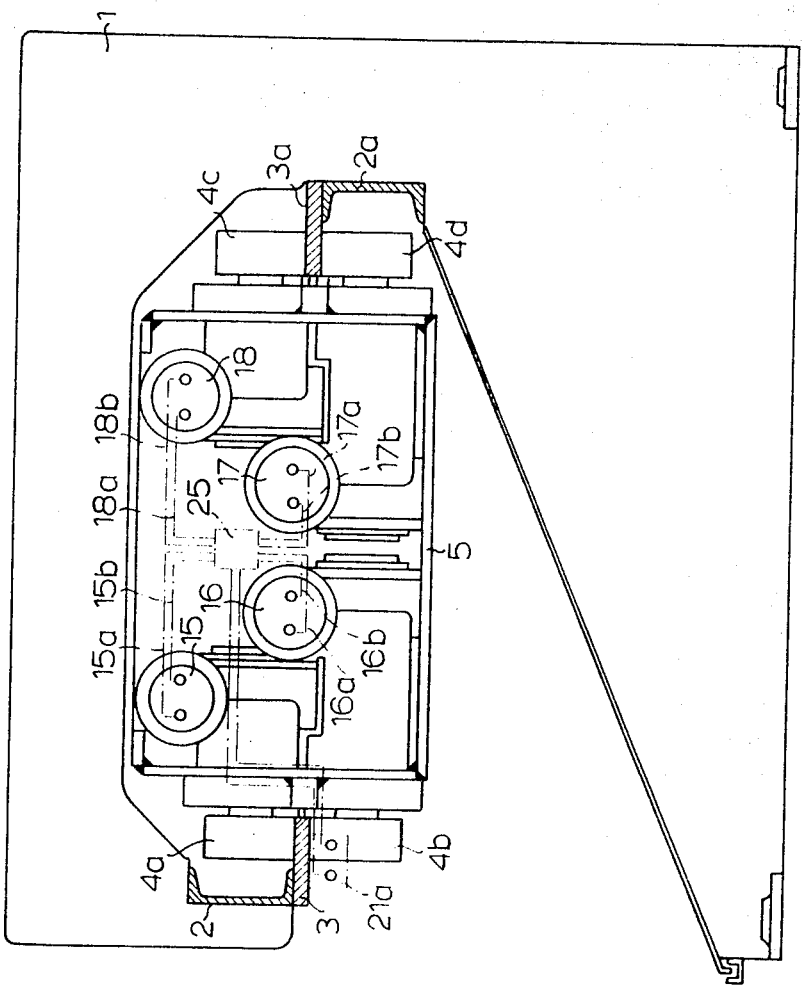
FIG. 3 is an enlarged sectional view taken along the line A–B in FIG.1.
Figure 4:
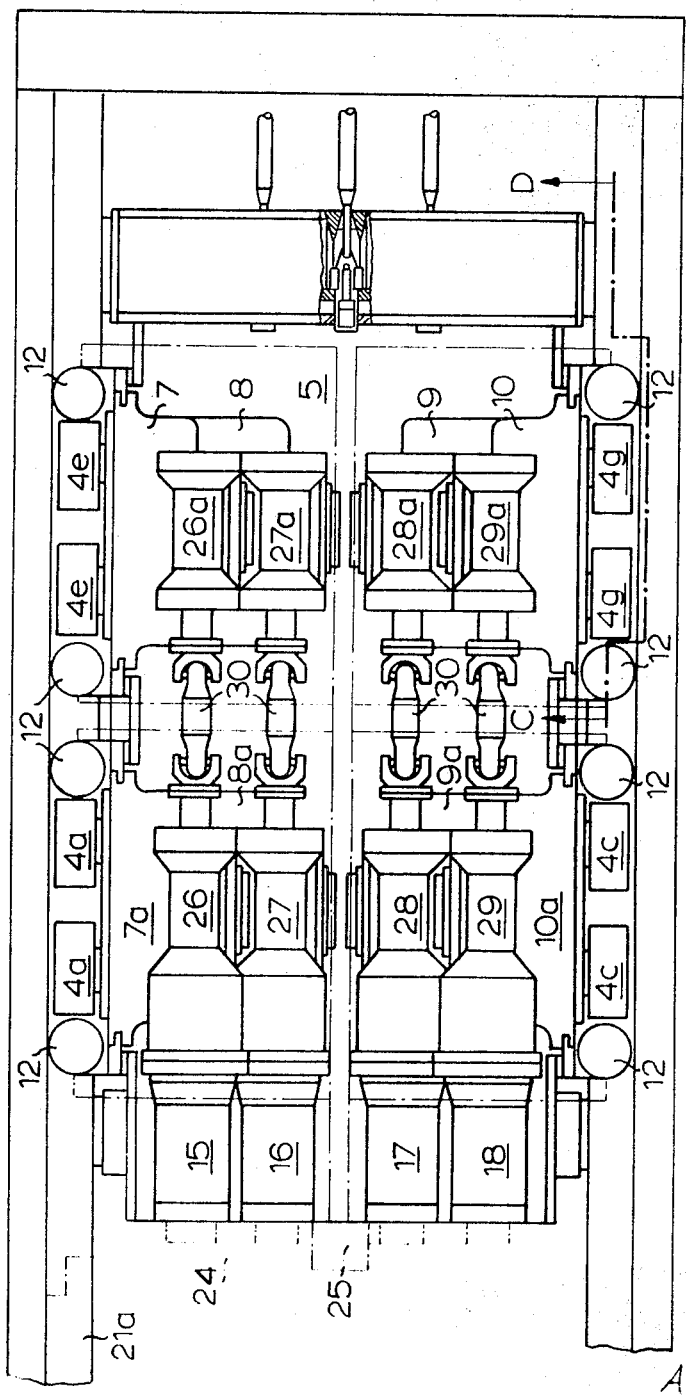
FIG. 4 is an enlarged view of the drawing carriage shown in place in the plan view of FIG. 2.
Figure 5:
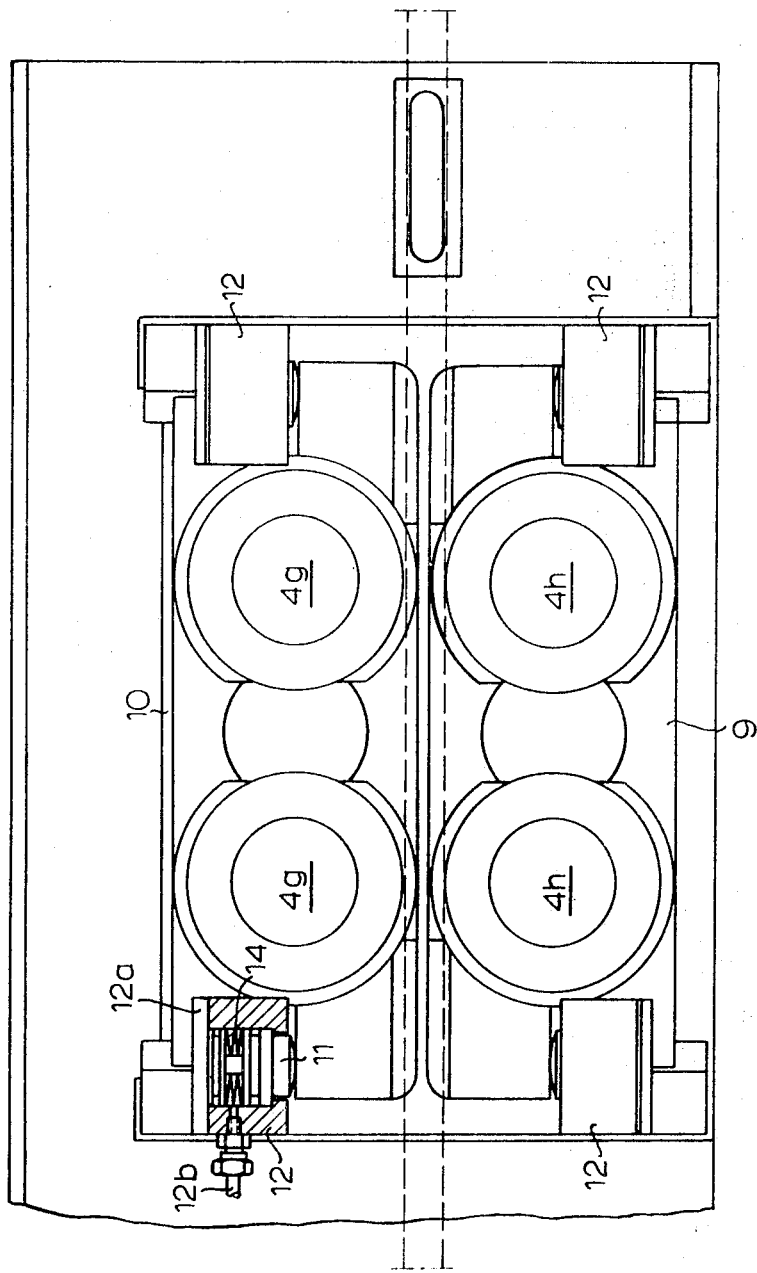
FIG. 5 is a partial end view taken along line C–D in FIG. 4.
Figure 8:
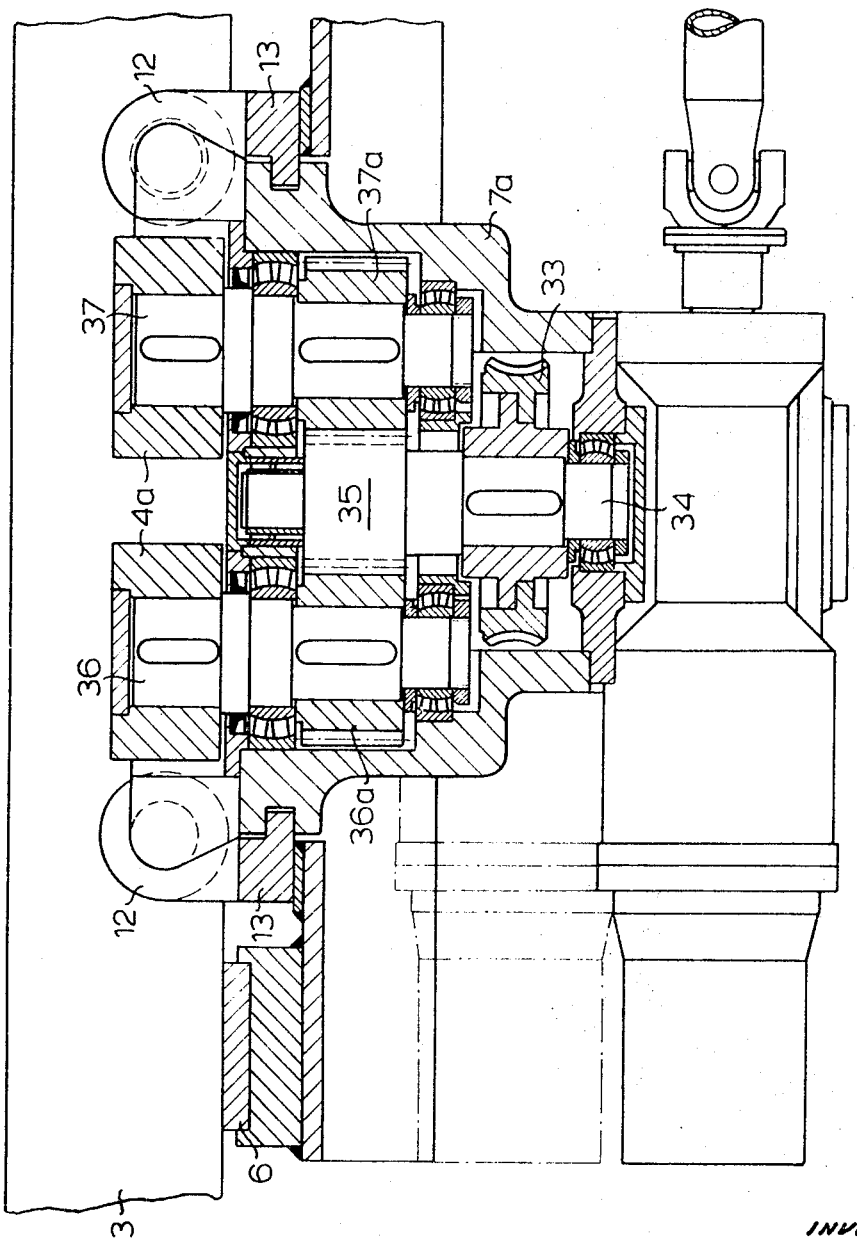
FIG. 8 is a partial sectional view taken along the line G–H of FIG. 6.

Referring to the drawing, the stands or posts 1 are connected through U-shaped members 2,2a and 6 (FIG. 3) which carry the guide tracks 3,3a for the wheels 4a to 4h of the drawing carriage 5. The number and size of the wheels or rollers varies in accordance with the desired drawing force and the permissible pressure which may be exerted. For the purpose of guiding the drawing carriage 5 along the sides, guide members 6 are provided, as shown in FIG. 8. These guide members 6 are made so that they are interchangeably insertable into the carriage 5, in a manner not shown, and ride along the inner frontal edges of the guide tracks 3 and 3a. The rollers or wheels 4a to 4h which bear against the guide tracks 3,3a from above and below, are secured together in pairs or groups with their intermediate drives, and are supported in the bridges 7,8,9,10 and 7a to 10a. These bridges are movably arranged in a vertical plane in the carriage 5. As shown in FIG. 5, each of the bridges 7 to 10 and 7a to 10a are loaded or have applied to them, two pistons 11 which are guided by cylinders 12. Plate or disk springs are, furthermore, guided by the cylinders 12. These springs abut, on one hand, the head 11, and on the other hand, they abut the cover 12a of the cylinder 12. The cylinders 12 are arranged in brackets 13 of the carriage 5. As long as the medium within the cylinders 12 is not under pressure, the rollers or wheels are pressed against the guide tracks 3 and 3a, only through the force of the springs 14. When pressurized fluid is applied to the hydraulic motors 15,16,17 and 18 from the hydraulic station 19, for the purpose of driving the rollers or wheels, the transmission of the fluid is accomplished through pipe lines 20 which are joined or flexibly arranged in the slide members 21. Through means of a conventional roller or wheel guide which is secured to the stands or posts 1, and not shown, these slide members are movably arranged along the guide track 3. Every two of these pipe lines or conduits 20 are interconnected through a joint 22. The connection of the pipe lines 20 to the slide members 21 and the joints 22, is accomplished through flexible hose or tubing 23, as shown schematically in FIG. 2. In the rear position of the drawing carriage 5, the pipe lines 20 and the slid members 21 assume or occupy the position outlined through dash-dot lines in FIG. 2. Two pipe lines 24 and 24a extend from the slide member 21a and toward a distributor 25 which is connected with motors 15,16,17 and 18 through corresponding pipe lines 15a–15b, 16a–1617a–17b, and 18a–18b.

Figure 6:
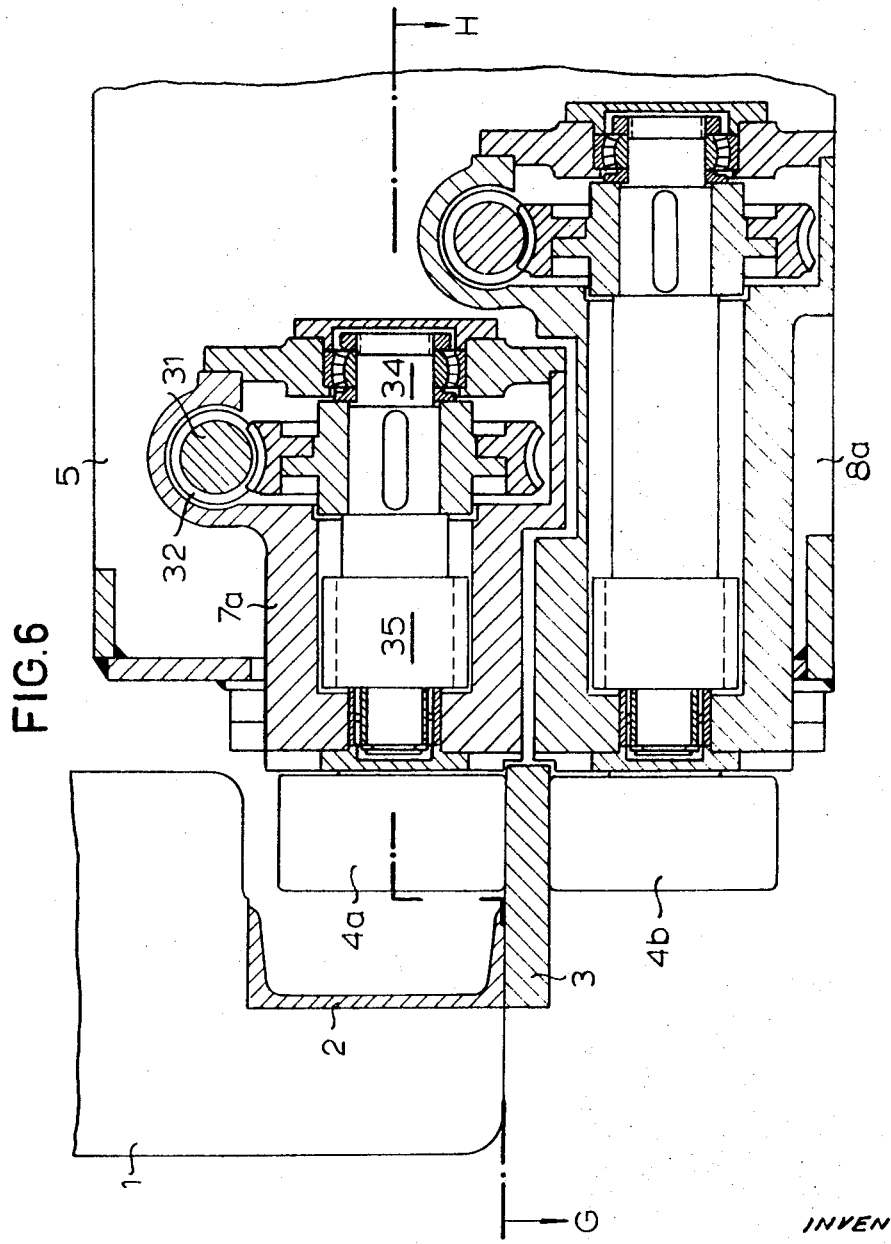
FIG. 6 is a partial sectional view of the intermediate driving mechanism linked to the rollers of the carriage, and is taken along line E–F in FIG. 7.
Figure 7:
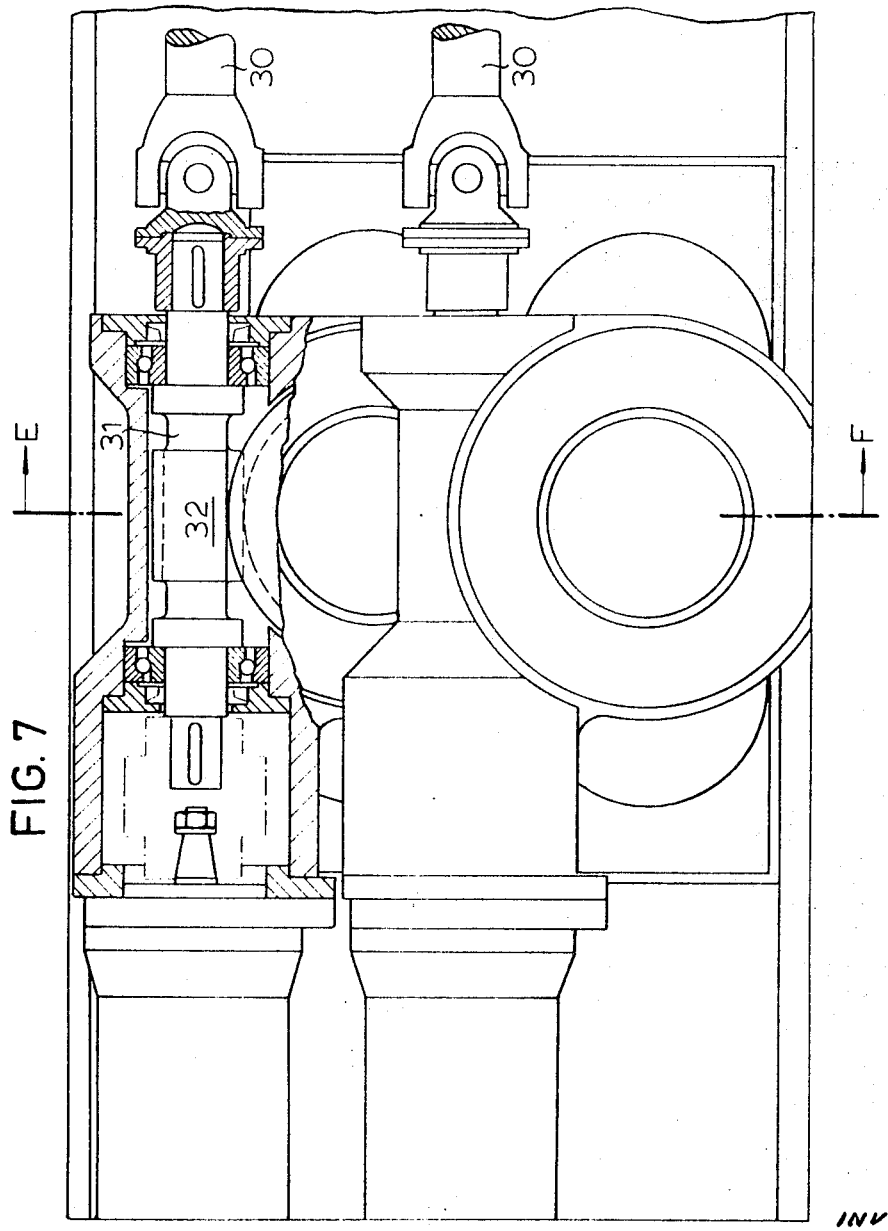
FIG. 7 is a partial sectional view of the intermediate driving mechanism for actuating the rollers of the driving carriage along the guide tracks of the drawing machine of FIG. 1.

The drive or the rollers of wheels is accomplished through intermediate drive members 26,27,28 and 29, as well as 26a, 27a, 28a and 29a. These intermediate drive members are interconnected through universal joints 30. A worm 32 is securely mounted upon the shaft 31 of each of the motors 15 to 18. These worms mesh with a corresponding worm gear 33 which is securely mounted upon a shaft 34. A pinion 35 is, furthermore, securely mounted upon each of the shafts 34. The pinion 35 meshes with two pinions 36a and 37a which are fixed to the shafts 36 and 37, respectively, of the rollers or wheels 4a to 4h, as shown in FIGS. 6, 7 and 8.

As may be seen from FIGS. 4, 6, 7 and 8, one hydraulic motor is used to drive each four rollers or wheels, as a result of the connections between the motors 15 to 18 with the shafts of the rollers 4a to 4h. Beneath the roller or wheel 4e are the rollers or wheels 4f, which are not shown in the drawing.

As shown in FIG. 9, three pumps are provided for transmitting the pressurized oil for the hydraulic motors 15 to 18. A motor M1 drives two of these pumps, P1 and P2. The third pump P3 has its own motor M2. As a result of this design, it is possible to select different drawing speeds. It is, of course, also possible to provide another pump combination for the purpose of selecting a larger number of drawing speeds. All cylinders 12 of the piston 11 are connected in parallel, and their fluid lines 12b are connected to the hydraulic motors 15 to 18, by way of the pipe lines 38,38a, the check valve 39,39a, and the flow lines 40 and 40a for transmitting fluid to and from the motors which are connected in parallel.

A pressure-setting valve 41,42 and 43, as well as an electromagnetically-actuatable control slide S1,S2, and S3, are provided for each one of the pumps P1,Ps, and P3. The pumps P1,P2, and P3 are, furthermore, connected to the flow lines 40 and 40a of the motors 15 to 18, through the check valves 44,45,46, the pipe line 47, and the electromagnetically-actuatable reversing slide S48. A pressure-setting valve 49 is connected to the slide S48, and is coupled to the electromagnetically-actuatable control slide S51, by way of the control line 50.

A second pressure-setting valve 53 is, furthermore, connected to the control slide S1, through the control line 52. The pressure-setting valve 41 communicates with the control slide S1, through the control line 56. The pressure-setting valve 43 is connected with the control slide S3, through the control line 54, whereas the pressure-setting valve 52 is connected, through the control line 55, with the control slide S2.

In operation, when the motors M1 and M2 are turned on and the control slide S48 is in the position shown in FIG. 9, the pumps P1,P2,and P3 return the pumped oil back into the tanks, or oil reservoir. When the drawing process is to be initiated, the slide S3 is transferred to a position in which the return flow from the pump P3 to the tank becomes interrupted. The pressure set on the pressure-setting valve 43 then becomes effective, because oil under pressure is transmitted from the pump P3 to the motors 15 to 18, by way of the check valve 46, the pipe line 47, and the slide S48, as well as the pipe line 40a. The oil flowing from the motors 15 to 18 can return to the tank or oil reservoir, through the pipe lines 40 and 57, the check valve 58, the slide S48, and through the pressure-setting valve 49. This results from the condition that the slide S51 was transferred into a position, beforehand, such that the control line 50 was made free of pressure, so that the oil from the motors 15 to 18 can flow off without pressure, through the pressure-setting valve 49. The pressurized oil is, furthermore, introduced into the cylinders 12 for the piston heads 11, through the check valve 39a, the pipe line 38a, and the pipe line 12b. The drawing carriage then rides at a substantially low velocity of speed.

For the purpose of attaining the desired drawing speed, the slides S1 and S2 associated with the pumps P1 and P2, respectively, are also actuated so that the return flow of the oil into the storage tank is discontinued or interrupted. The pressure selected through the pressure-setting valves 41 and 42, becomes then effective. When the drawing process is to be terminated, the slides S1,S2, and S3 are returned to the positions shown in FIG. 9. In this manner, the pressure-setting valves 43,42,and 41 become actuated, through the control lines 54,55 and 56, so that the oil pumped by the pumps P1,P2, and P3 is returned to the storage tank. The slide S51 is, furthermore, transferred to the position shown in FIG. 9, so that the pressure-setting valve 49 is actuated through the control line 50 in a manner whereby the set pressure becomes effective.

The oil which flows from the motors 15 to 18, through the lines 57 and 40, through the check valve 58 and the slide S48, can return to the storage tank only by overcoming or exceeding the pressure set on the pressure-setting valve 49. As a result of this condition, the oscillating energy of the drawing carriage is dissipated. Oil flow from the motors 16,17 and 18 and into the line 40a is prevented through the check valves 59,60 and 61. A portion of the pressured oil from the motors 15 to 18 is transmitted through the line 40, the check valve 39, and pipe line 38, and applied to the line 12b, for the purpose of maintaining also pressure within the cylinders 12 during the braking process and thereby have the rollers or wheels pressed against their guide tracks. As soon as the drawing carriage becomes stationary, the pressure of the oil within the cylinders 12 may be reduced, since a portion of the oil can return to the storage tank through the pipe line 38, the throttle valve 65, and the leakage line 66. The leakage oil resulting during the operation of the motors 15 to 18, may flow off or be drained through the lines 66 and 67.

For the purpose of bringing the drawing carriage into the initial position in front of the matrix frame with greater velocity, the slide S48 is actuated so that the line 47 is connected with the line 40. The slide S51 becomes actuated simultaneously so that the pressurized oil derived from the motor 15 is caused to flow afterwards through the line 40a, the pressure-setting valve 49, and into the storage tank. In this flow to the storage tank, the oil is not under pressure because no pressure prevails within the control line 50. In order that the entire oil delivered by the pumps P1,P2 and P3 is applied to the motor 15, the slides S1,S2,S3 are actuated so that the pressure-setting valves 41,42 and 43 prevent or inhibit flow of the pressurized oil into the storage tank. The pressure set on these valves is made, at the same time, effective. The pressurized oil then flows to the motor 15 through the line 47, the slide S48, and the line 40. The motor 15 can, thereby, achieve the corresponding higher rotational speed, since fluid flow to the motors 16 to 18 is prevented through the check valve 58. The controllable check valves 62,63 and 64 become opened through the control line 68 so that the pressurized oil from the motors 16, 17 and 18 drives the wheels or rollers of the drawing carriage in return flow through the check valves 62,63,64 and 59, 60, and 61. During the return action, the rollers or wheels must again be pressed against their guide tracks. For this purpose, the pressurized oil is again passed into the line 12b of the cylinder 12, through the check valve 39 and the line 38. For a predetermined spacing from the matrix frame, it is necessary to brake the drawing carriage with its returning increased velocity. As described above, the lines 47 and 40 are connected through the corresponding position of the slide S48, during the return of the drawing carriage. In order to make possible the braking action, the slides S1,S2 and S3 are actuated, so that the pumps P1,P2,P3 deliver oil without pressure through the pressure-setting valves 41,42 and 43, and into the storage tank. The slide S51 is brought simultaneously into such a position, so that the control line 50 is blocked. As a result, the pressure set upon the pressure-setting valve 49 becomes effective, in which case not only the oil from the motor 15, but instead also the oil from the motors 16,17 and 18 may return to the storage tank through the pressure-setting valve 49. All motors and thereby all rollers become, consequently, braked. The oil delivered by the motors 16,17 and 18 which was applied into the circuit upon the return of the carriage,can now no longer flow through the controlled check valves 62,63, and 64. This results from the condition that these check valves became closed since the line 47 as well as the lines 68 is no longer subjected to pressure.

In order that the motors 16, 17 and 18 may draw oil through the lines 40 and 47,during the braking process, the controlled check valve 58 becomes opened as a result of the pressure prevailing within the line 40a, which is determined by the pressure-setting valve 49. When the return velocity has been reduced to the extent that the drawing carriage may ride against the matrix frame without danger of incurring damage, the slide S1 is transferred to such a position that the lines 56 and 52 become interconnected with each other. Since, however, the pressure set at the pressure-setting valve 53 is substantially lower than the pressure setting of the valve 41, the pressure associated with the setting valve 53 becomes effective. The oil delivered by the pump P1 can, therefore, only operate with substantially low pressure.

At the same time that the slide S1 is changed in position, the slide S51 is also changed in position so that the oil flowing out of the line 40a may flow off without pressure through the slide S48 and the pressure-setting valve 49. As a result, the drawing carriage may drive with a substantially low velocity against the matrix frame and arrive at a standstill or become stationary. This low velocity of the drawing carriage is determined by the fluid quantity delivered by the pump P1, as well as by the pressure set on on the pressure-setting valve 53.

During the time that the drawing carriage abuts the matrix frame, the oil delivered by the pump P1 can flow off into the storage tank by overcoming the pressure associated with the pressure-setting valve 53 and thereupon flow into the storage tank through the pressure-setting valve 41. After a predetermined time interval, the slide S1 is actuated so that the oil delivered by the pump P1 can return to the storage tank without pressure, through the pressure-setting valve 41. The check valves 45 and 46 prevent oil flow from the pump P1 to the pressure-setting valves 42 and 43, when only the pump P1 operates to deliver pressurized fluid.

The actuation of all slides is accomplished through a conventional follow-up arrangement which assures a fully automatic process for the drawing carriage.

It will be understood that each of the elements described above, or two or more together, may also find a useful application in other types of constructions differing from the types described above.

While the invention has been illustrated and described as embodied in drawing machines, it is not intended to be limited to the details shown, since various modifications and structural changes may be made without departing in any way from the spirit of the present invention.

What is claimed as new and desired to be protected by Letters Patent is set forth in the appended

1. A drawbench for drawing elongated articles, comprising, in combination, guide means extending along a drawing path of said elongated articles; support means supporting said guide means; carriage means movable along said guide means for drawing said elongated articles along said drawing path; roller means rotatably mounted on said carriage means and in rolling contact with said guide means; drive means mounted on said carriage means for generating power required to move said carriage means along said guide means for drawing said articles, said power required to move said carriage means being transmitted to said carriage means solely through friction between said roller means and said guide means; and fluid operated pressure means cooperating with said roller means for pressing said roller means against said guide means with a pressure dependent upon the torque required for rotating said roller means.

2. The drawbench for drawing elongated articles as defined in claim 1 wherein said drive means comprises hydraulic motor means.

3. The drawbench for drawing elongated articles as defined in claim 2 including parallel connected hydraulic flow line means communicating with said hydraulic motor means for conveying fluid flow to and from said motor means.

4. The drawbench for drawing elongated articles as defined in claim 3 including fluid pressure line means for transmitting fluid under pressure to said hydraulic motor means through said hydraulic flow line means; and check valve means between said hydraulic fluid flow line means and said fluid pressure line means.

5. The drawback for drawing elongated articles as defined in claim 4 said pressure means comprising hydraulically-operated piston means linked to said roller means for pressing said roller means against said guide means with pressure dependent upon the torque required to rotate said roller means.

6. The drawbench for drawing elongated articles as defined in claim 5 including hydraulic cylinder means for said piston means to actuate said piston means with pressurized fluid, said hydraulic cylinder means being connected in parallel with said hydraulic fluid flow line means for to said pressure line means.

7. The drawbench for drawing elongated articles as defined in claim 6 including pressure-setting valve means communicating with said fluid flow line means and said pressure line means.

8. The drawbench for drawing elongated articles as defined in claim 2 including hydraulic pump means communicating with said hydraulic motor means for supplying said hydraulic motor means with fluid under pressure.

9. A drawbench for drawing elongated articles comprising, in combination, guide means extending along a drawing path of said elongated articles; support means supporting said guide means; carriage means movable along said guide means for drawing said elongated articles along said drawing path; roller means rotatably mounted on said carriage means and in rolling contact with said guide means; drive means mounted on said carriage means for generating power required to move said carriage means along said guide means for drawing said articles, said power required to move said carriage means being transmitted to said carriage means solely through friction between said roller means and said guide means; and pressure means cooperating with said roller means for pressing said roller means against said guide means with a pressure dependent upon the torque required for rotating said roller means.

10. The drawbench for drawing elongated articles as defined in claim 9 including drive linkage means connecting said roller means with said drive means; and bridge-shaped means for supporting said roller means and said drive linkage means and being movably mounted in a vertical plane in said carriage means.

* * * * *